US008850162B2

(12) United States Patent
Gonion

(10) Patent No.: US 8,850,162 B2
(45) Date of Patent: Sep. 30, 2014

(54) MACROSCALAR VECTOR PREFETCH WITH STREAMING ACCESS DETECTION

(75) Inventor: Jeffry E. Gonion, Campbell, CA (US)

(73) Assignee: Apple Inc., Cupertino, CA (US)

( * ) Notice: Subject to any disclaimer, the term of this patent is extended or adjusted under 35 U.S.C. 154(b) by 315 days.

(21) Appl. No.: 13/477,696

(22) Filed: May 22, 2012

(65) Prior Publication Data

US 2013/0318306 A1 Nov. 28, 2013

(51) Int. Cl.
*G06F 12/00* (2006.01)

(52) U.S. Cl.
USPC ............................. 711/213; 711/154; 712/207

(58) Field of Classification Search
USPC .................................... 711/154, 213; 712/207
See application file for complete search history.

(56) References Cited

U.S. PATENT DOCUMENTS 5,754,876 A 5/1998 Tamaki et al.

FOREIGN PATENT DOCUMENTS

EP 0348495 B1 12/1993

OTHER PUBLICATIONS

Gschwind et al., "Vector Prefetching," Newsletter ACM SIGARCH, Computer Architecture News, vol. 23 Issue 5, Dec. 1995, pp. 1-7.

*Primary Examiner* — John Lane
(74) *Attorney, Agent, or Firm* — Meyertons, Hood, Kivlin, Kowert & Goetzel, P.C.

(57) ABSTRACT

A method and system for implementing vector prefetch with streaming access detection is contemplated in which an execution unit such as a vector execution unit, for example, executes a vector memory access instruction that references an associated vector of effective addresses. The vector of effective addresses includes a number of elements, each of which includes a memory pointer. The vector memory access instruction is executable to perform multiple independent memory access operations using at least some of the memory pointers of the vector of effective addresses. A prefetch unit, for example, may detect a memory access streaming pattern based upon the vector of effective addresses, and in response to detecting the memory access streaming pattern, the prefetch unit may calculate one or more prefetch memory addresses based upon the memory access streaming pattern. Lastly, the prefetch unit may prefetch the one or more prefetch memory addresses into a memory.

25 Claims, 7 Drawing Sheets

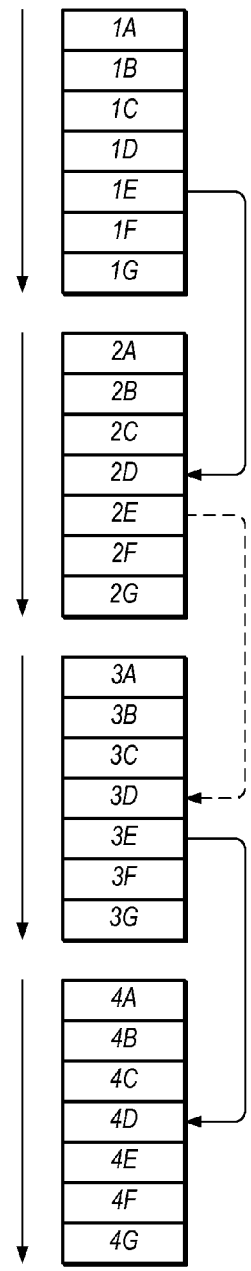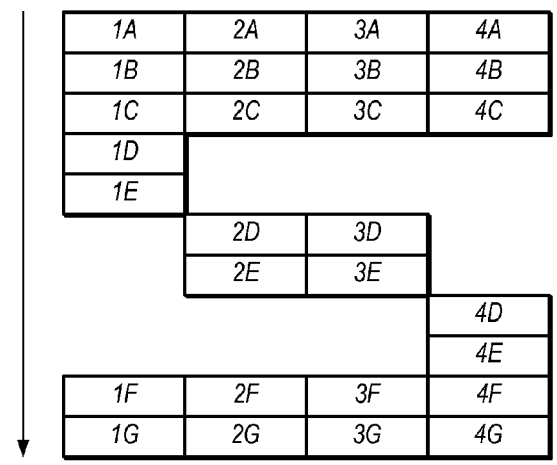
FIG. 3

| | | | | |
|---|---|---|---|---|
| x = 0, | A[x] = 1, | r = 1, | s = 0, | B[x] = 1 |
| x = 1, | A[x] = 10, | r = 1, | s = 16, | B[x] = 17 |
| x = 2, | A[x] = 16, | r = 1, | s = 16, | B[x] = 17 |
| x = 3, | A[x] = 16, | r = 1, | s = 26, | B[x] = 27 |
| x = 4, | A[x] = 26, | r = 1, | s = 29, | B[x] = 30 |
| x = 5, | A[x] = 29, | r = 1, | s = 9, | B[x] = 10 |
| x = 7, | A[x] = 9, | r = 13, | s = 9, | B[x] = 22 |
| x = 7, | A[x] = 1, | r = 0, | s = 9, | B[x] = 9 |
| x = 8, | A[x] = 20, | r = 0, | s = 20, | B[x] = 20 |
| x = 9, | A[x] = 0, | r = 17, | s = 20, | B[x] = 37 |
| x = 10, | A[x] = 16, | r = 17, | s = 9, | B[x] = 26 |
| x = 11, | A[x] = 14, | r = 17, | s = 1, | B[x] = 18 |
| x = 12, | A[x] = 20, | r = 17, | s = 17, | B[x] = 34 |
| x = 13, | A[x] = 14, | r = 17, | s = 19, | B[x] = 36 |
| x = 14, | A[x] = 22, | r = 17, | s = 15, | B[x] = 32 |
| x = 15, | A[x] = 13, | r = 17, | s = 30, | B[x] = 47 |

*FIG. 4A*

| x = | 0 | 1 | 2 | 3 | 4 | 5 | 6 | 7 |
|---|---|---|---|---|---|---|---|---|
| A[x] = | 1 | 10 | 16 | 16 | 26 | 29 | 9 | 1 |
| r = A[x+s] = | 1 | | | | | | | |
| s = A[x+r] = | | 16 | 16 | 26 | 29 | 9 | | |
| r = A[x+s] = | | | | | | | 13 | 0 |
| B[x] = | 1 | 17 | 17 | 27 | 30 | 10 | 22 | 9 |

| x = | 8 | 9 | 10 | 11 | 12 | 13 | 14 | 15 |
|---|---|---|---|---|---|---|---|---|
| A[x] = | 20 | 0 | 16 | 14 | 20 | 14 | 22 | 13 |
| s = A[x+r] = | 20 | | | | | | | |
| r = A[x+s] = | | 17 | | | | | | |
| s = A[x+r] = | | | 9 | 1 | 17 | 19 | 15 | 30 |
| B[x] = | 20 | 37 | 26 | 18 | 34 | 36 | 32 | 47 |

*FIG. 4B*

SOURCE CODE

```
r = 0 ;
s = 0 ;
for (x=0; x<KSIZE; ++x)
{
    if (A[x] < FACTOR)
    {
        r = A[x+s] ;
    {
    else
    {
        s = A[x+r] ;
    }
    B[x] = r + s ;
}
```

FIG. 5A

VECTORIZED CODE

```
r = 0 ;
s = 0 ;
x = VectorIndex (0,1) ;
goto Loop1Tail ;
Loop1:
    s = PropagatePriorF (s,p0) ;
    ~p0; t = VectorReadInt (A, x) ;
    p1 = (t < FACTOR) ;
    i2 = ConditionalStop (p1, kTF | kFT) ;
    p2 = 0 ;
Loop2:
    !p0; p2 = GeneratePredicates (p2, i2) ;
    ~p2; t = VectorTest (p1) ;
    if ( !FIRST () ) goto Skip1 ;
    t1 = x + s ;
    ~p2; r = VectorReadInt (A, t1) ;
    goto Skip2 ;
Skip1 :
    r = PropagatePriorF (r, p2) ;
    t2 = x + r ;
    ~p2; s = VectorReadInt (A, t2) ;
    s = PropagatePostT (s, s, p2) ;
Skip2 :
    if ( !CARRY () ) goto Loop2 ;
    v = r + s ;
    ~p0; s = VectorWriteInt (B, x, v) ;
    x += VECLEN ;
Loop1Tail:
    p0 = (x < KSIZE) ;
    if ( FIRST (p0) ) goto Loop1 ;
```

FIG. 5B

**EXAMPLE 2A
VECTORIZED
(NON-SPECULATIVE)**

```
         j = 0;
         x = VectorIndex (0,1) ;
         goto Loop1Tail;
Loop1:
    p3 = 0;
    j = PropagatePriorF (j, p0) ;
    ~p0; t = VectorReadInt (A, x) ;
    p1 = t < FACTOR;
    p2 = ConditionalStop (p1,  kTT | kTF) ;
Loop2:
    t = x + j ;
    !p0; p3 = GeneratePredicates (p3, p2) ;
    ~p3; t = VectorTest (p1) ;
    if ( NONE () ) goto Loop2Tail ;
    !p3; p4 = p1 + 0;
    ~p4; j = VectorRead (A, t) ;
    j = PropagatePostT (j, j, p4) ;
Loop2Tail:
    if ( !CARRY () ) goto Loop2
    ~p0; VectorWrite (B, x, j) ;
    x += VECLEN;
Loop1Tail:
    p0 = (x < KSIZE) ;
    if ( FIRST () ) goto Loop1;
```

FIG. 6A

**EXAMPLE 2B
VECTORIZED
(SPECULATIVE)**

```
         j = 0;
         x = VectorIndex (0,1) ;
         goto Loop1Tail ;
Loop1:
    p3 = 0 ;
    j = PropagatePriorF (j, p0) ;
Loop2:
    !p0; p5 = Remaining (p3) ;
    ~p5; t = x + j ;
    ~p5; t = VectorReadIntFF (A, t, ps) ;
    ~p5; p5 &= ps ;
    ~p5; p1 (t < FACTOR) ;
    !p5; i2 = ConditionalStop (p1,  kTT | kTF) ;
    !p0; p3 = GeneratePredicates (p3, i2) ;
    ~p3; VectorTest (p1) ;
    ~p3; if (NONE () ) goto Loop2Tail ;
    !p3; p4 = p1 + 0 ;
    ~p4; j = VectorRead (A, x) ;
    j = PropagatePostT (j, j, p4) ;
Loop2Tail:
    ~p0; VectorTest (p3) ;
    if ( !LAST () ) goto Loop2 ;
    ~p0; VectorWrite (B, x, j) ;
    x += VECLEN ;
Loop1Tail:
    p0 = (x < KSIZE) ;
    if ( FIRST () ) goto Loop1 ;
```

FIG. 6B

MACROSCALAR VECTOR PREFETCH WITH STREAMING ACCESS DETECTION

BACKGROUND

1. Technical Field

This disclosure relates to processors, and more particularly to vector instruction execution and prefetch stream detection.

2. Description of the Related Art

Memory prefetching has been widely used for some time. Generally speaking, a processor prefetcher may keep track of previous memory access request addresses. As each request is sent, the prefetcher may compare the new address to the previous addresses to determine whether a particular access pattern exists. The access pattern is commonly referred to as a stream or stream pattern. If the prefetcher detects a stream, the prefetcher may calculate the stride or distance between addresses to determine what the next one or more memory access addresses will be based upon the stream. The prefetcher may then prefetch the data at those one or more addresses into the next level of memory hierarchy. There are a number of different mechanisms that exist to determine the stream.

More particularly, some hardware prefetchers in a conventional processor typically wait for a memory access instruction to execute numerous times to confirm that memory accesses are being performed in a streaming pattern, and to identify the stride of that pattern. If hardware streaming prefetch is initiated too soon (i.e., before a true stream is identified), performance may suffer due to unnecessary memory accesses being performed. If the prefetch is initiated too late, performance may suffer due to memory latency because the data that is requested has not already been fetched from memory.

SUMMARY OF THE EMBODIMENTS

Various embodiments of a method and apparatus for implementing Macroscalar vector prefetch with streaming access detection are disclosed. Broadly speaking, an execution unit such as a vector execution unit, for example, executes a vector memory access instruction that references an associated vector of effective addresses. The vector of effective addresses includes a number of elements, each of which includes a memory pointer. The vector memory access instruction is executable to perform multiple independent memory access operations using at least some of the memory pointers of the vector of effective addresses. A prefetch unit, for example, may detect a memory access streaming pattern based upon the vector of effective addresses, and in response to detecting the memory access streaming pattern, the prefetch unit may calculate one or more prefetch memory addresses based upon the memory access streaming pattern. Lastly, the prefetch unit may prefetch the one or more prefetch memory addresses into a memory.

In one embodiment, the method includes executing a vector memory access instruction that references an associated vector of effective addresses. The vector of effective addresses includes a number of elements, each of which includes a memory pointer. The vector memory access instruction is executable to perform multiple independent memory access operations using at least some of the memory pointers of the vector of effective addresses. The method also includes detecting a memory access streaming pattern based upon the vector of effective addresses, and in response to detecting the memory access streaming pattern, calculating one or more prefetch memory addresses based upon the memory access streaming pattern. Lastly, the method may include prefetching the one or more prefetch memory addresses into a memory circuit.

In one specific implementation, detecting the memory access streaming pattern includes performing a subtraction operation between memory pointers of each pair of adjacent elements of the vector of effective addresses to produce a number of result values.

In another specific implementation, detecting the memory access streaming pattern further includes determining that the result values are equal to a same value and setting a memory access stride length of the memory access streaming pattern to the same value.

BRIEF DESCRIPTION OF THE DRAWINGS

FIG. 3 is a diagram illustrating an example of parallelization of a program code loop.

FIG. 4A is a diagram illustrating a sequence of variable states during scalar execution of the loop shown in Example 1.

FIG. 4B is a diagram illustrating a progression of execution for Macroscalar vectorized program code of the loop of Example 1.

FIG. 5A and FIG. 5B are diagrams illustrating one embodiment of the vectorization of program source code.

FIG. 6A is a diagram illustrating one embodiment of non-speculative vectorized program code.

FIG. 6B is a diagram illustrating another embodiment of speculative vectorized program code.

Figure 1:
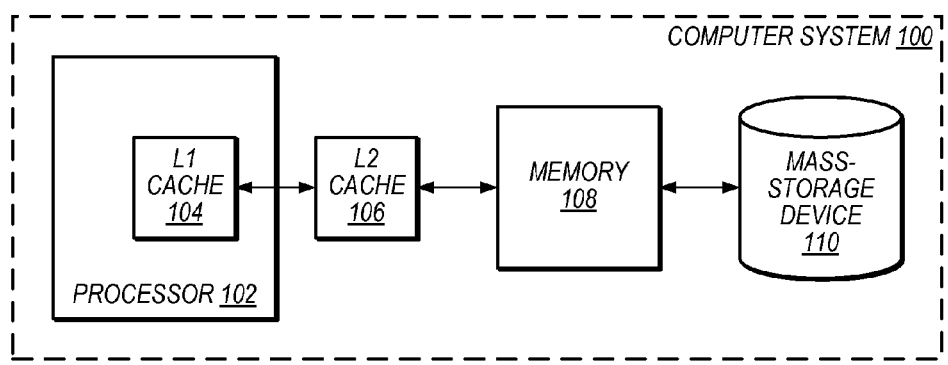
FIG. 1 is a block diagram of one embodiment of a computer system.

Specific embodiments are shown by way of example in the drawings and will herein be described in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure. Examples of features provided in the disclosure are intended to be illustrative rather than restrictive unless stated otherwise.

As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six, interpretation for that unit/circuit/component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Computer System Overview

Turning now to FIG. 1, a block diagram of one embodiment of a computer system is shown. Computer system 100 includes a processor 102, a level two (L2) cache 106, a memory 108, and a mass-storage device 110. As shown, processor 102 includes a level one (L1) cache 104. It is noted that although specific components are shown and described in computer system 100, in alternative embodiments different components and numbers of components may be present in computer system 100. For example, computer system 100 may not include some of the memory hierarchy (e.g., memory 108 and/or mass-storage device 110). Alternatively, although the L2 cache 106 is shown external to the processor 102, it is contemplated that in other embodiments, the L2 cache 106 may be internal to the processor 102. It is further noted that in such embodiments, a level three (L3) cache (not shown) may be used. In addition, computer system 100 may include graphics processors, video cards, video-capture devices, user-interface devices, network cards, optical drives, and/or other peripheral devices that are coupled to processor 102 using a bus, a network, or another suitable communication channel (all not shown for simplicity).

In various embodiments, processor 102 may be representative of a general-purpose processor that performs computational operations. For example, processor 102 may be a central processing unit (CPU) such as a microprocessor, a microcontroller, an application-specific integrated circuit (ASIC), or a field-programmable gate array (FPGA). However, as described further below, processor 102 may include one or more mechanisms for vector processing (e.g., vector execution units). An example vector execution unit of processor 102 is described in greater detail below in conjunction with the description of FIG. 2.

The mass-storage device 110, memory 108, L2 cache 10, and L1 cache 104 are storage devices that collectively form a memory hierarchy that stores data and instructions for processor 102. More particularly, the mass-storage device 110 may be a high-capacity, non-volatile memory, such as a disk drive or a large flash memory unit with a long access time, while L1 cache 104, L2 cache 106, and memory 108 may be smaller, with shorter access times. These faster semiconductor memories store copies of frequently used data. Memory 108 may be representative of a memory device in the dynamic random access memory (DRAM) family of memory devices. The size of memory 108 is typically larger than L1 cache 104 and L2 cache 106, whereas L1 cache 104 and L2 cache 106 are typically implemented using smaller devices in the static random access memories (SRAM) family of devices. In some embodiments, L2 cache 106, memory 108, and mass-storage device 110 are shared between one or more processors in computer system 100.

In some embodiments, the devices in the memory hierarchy (i.e., L1 cache 104, etc.) can access (i.e., read and/or write) multiple cache lines per cycle. These embodiments may enable more effective processing of memory accesses that occur based on a vector of pointers or array indices to non-contiguous memory addresses.

It is noted the data structures and program instructions (i.e., code) described below may be stored on a non-transitory computer-readable storage device, which may be any device or storage medium that can store code and/or data for use by a computer system (e.g., computer system 100). Generally speaking, a non-transitory computer-readable storage device includes, but is not limited to, volatile memory, non-volatile memory, magnetic and optical storage devices such as disk drives, magnetic tape, compact discs (CDs), digital versatile discs or digital video discs (DVDs), or other media capable of storing computer-readable media now known or later developed. As such, mass-storage device 110, memory 108, L2 cache 10, and L1 cache 104 are all examples of non-transitory computer readable storage devices.

Processor

Figure 2:
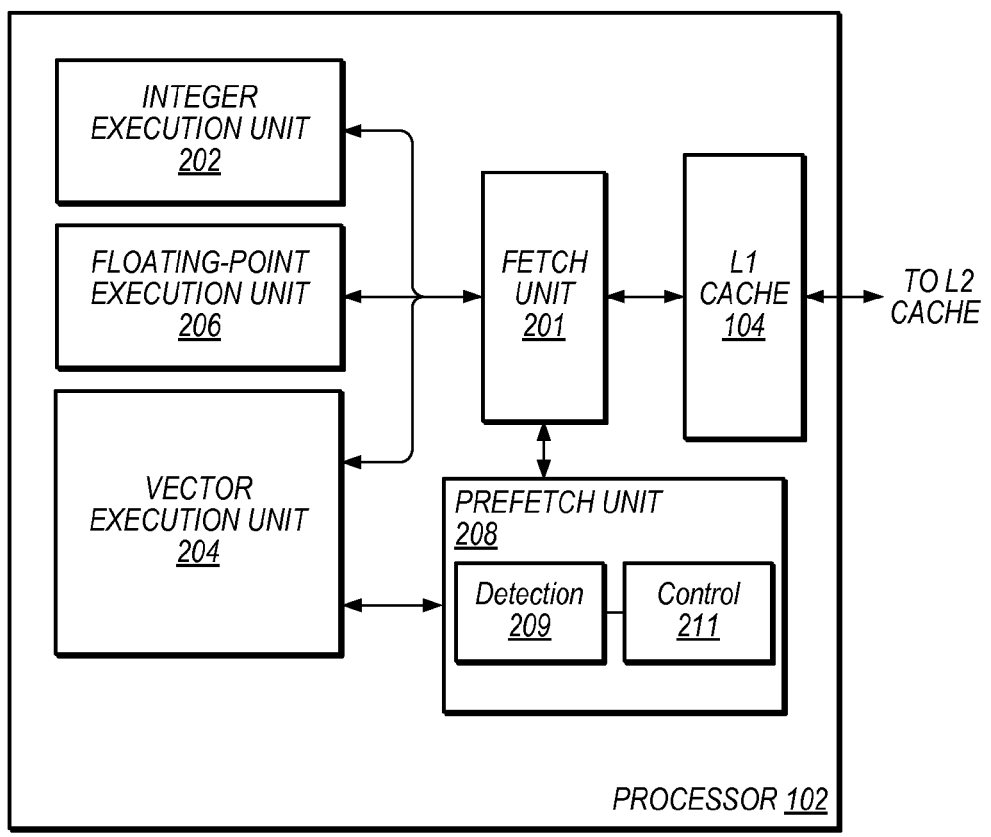
FIG. 2 is a block diagram illustrating additional details an embodiment of the processor shown in FIG. 1.

Referring to FIG. 2, a block diagram illustrating additional details of an embodiment of the processor of FIG. 1 is shown. In the embodiment shown in FIG. 2, processor 102 may include a number of pipeline stages, although for brevity not all are shown in FIG. 2. Accordingly, as shown, processor 102 includes L1 cache 104, an instruction fetch unit 201, an integer execution unit 202, a floating-point execution unit 206, a vector execution unit 204, and a prefetch unit 208. It is noted that integer execution unit 202, floating-point execution unit 206, and vector execution unit 204 as a group may be interchangeably referred to as "the execution units." It is also noted that although the prefetch unit 208 is shown as a separate unit, it is contemplated that in other embodiments, the prefetch unit 208 may be part of the fetch unit 201, or part of any or all of the various illustrated execution units (e.g., 202, 204, and 206), or part of a load/store execution unit or memory unit (not shown), as desired.

In various embodiments, the execution units may perform computational operations such as logical operations, mathematical operations, or bitwise operations, for example, for an associated type of operand. More specifically, integer execution unit 202 may perform computational operations that involve integer operands, floating-point execution unit 206 may perform computational operations that involve floating-point operands, and vector execution unit 204 may perform computational operations that involve vector operands. Integer execution units and floating-point execution units are generally known in the art and are not described further for brevity. As noted above, although the embodiment of processor 102 shown in FIG. 2 includes a particular set of components, it is contemplated that in alternative embodiments processor 102 may include different numbers or types of execution units, functional units, and pipeline stages such as an instruction decode unit, a scheduler or reservations stations, a reorder buffer, a memory management unit, I/O interfaces, etc. that may be coupled to the execution units.

The vector execution unit 204 may be representative of a single-instruction-multiple-data (SIMD) execution unit in the classical sense, in that it may perform the same operation on multiple data elements in parallel. However, it is noted that in some embodiments, the vector instructions described here may differ from other implementations of SIMD instructions. For example, in an embodiment, elements of a vector operated on by a vector instruction may have a size that does not vary with the number of elements in the vector. By contrast, in some SIMD implementations, data element size does vary with the number of data elements operated on (e.g., a SIMD architecture might support operations on eight 8-bit elements, but only four 16-bit elements, two 32-bit elements, etc.). In one embodiment, the vector execution unit 204 may operate on some or all of the data elements that are included in vectors of operands. More particularly, the vector execution unit 204 may be configured to concurrently operate on different elements of a vector operand of a vector program instruction.

In one embodiment, the vector execution unit 204 may include a vector register file (not shown) which may include vector registers that can hold operand vectors and result vectors for the vector execution unit 204. In some embodiments, there may be 32 vector registers in the vector register file, and each vector register may include 128 bits. However, in alternative embodiments, there may be different numbers of vector registers and/or different numbers of bits per register.

The vector execution unit 204 may be configured to retrieve operands from the vector registers and to execute vector instructions that cause vector execution unit 204 to perform operations in parallel on some or all of the data elements in the operand vector. For example, vector execution unit 204 can perform logical operations, mathematical operations, or bitwise operations on the elements in the vector. Vector execution unit 204 may perform one vector operation per instruction cycle (although as described above, a "cycle" may include more than one clock cycle that may be used to trigger, synchronize, and/or control vector execution unit 204's computational operations).

In one embodiment, vector execution unit 204 may support vectors that hold N data elements (e.g., bytes, words, doublewords, etc.), where N may be any positive whole number. In these embodiments, vector execution unit 204 may perform operations on N or fewer of the data elements in an operand vector in parallel. For example, in an embodiment where the vector is 256 bits in length, the data elements being operated on are four-byte elements, and the operation is adding a value to the data elements, these embodiments can add the value to any number of the elements in the vector. It is noted that N may be different for different implementations of processor 102.

The vector execution unit 204 may, in various embodiments, include at least one control signal that enables the dynamic limitation of the data elements in an operand vector on which vector execution unit 204 operates. Specifically, depending on the state of the control signal, vector execution unit 204 may selectively operate on any or all of the data elements in the vector. For example, in an embodiment where the vector is 512 bits in length and the data elements being operated on are four-byte elements, the control signal can be asserted to prevent operations from being performed on some or all of 16 data elements in the operand vector. Note that "dynamically" limiting the data elements in the operand vector upon which operations are performed can involve asserting the control signal separately for each cycle at runtime.

In some embodiments, as described in greater detail below, based on the values contained in a vector of predicates or one or more scalar predicates, vector execution unit 204 applies vector operations to selected vector data elements only. In some embodiments, the remaining data elements in a result vector remain unaffected (which may also be referred to as "predication") or are forced to zero (which may also be referred to as "zeroing" or "zeroing predication"). In some embodiments, the clocks for the data element processing subsystems ("lanes") that are unused due to predication or zeroing in vector execution unit 204 can be power and/or clock-gated, thereby reducing dynamic power consumption in vector execution unit 204.

In various embodiments, the architecture may be vector-length agnostic to allow it to adapt parallelism at runtime. More particularly, when instructions or operations are vector-length agnostic, the operation (i.e., instruction, etc.) may be executed using vectors of any length, up to the limitations imposed by the supporting hardware. For example, in embodiments in which vector execution hardware supports vectors that can include eight separate four-byte elements (thus having a vector length of eight elements), a vector-length agnostic operation can operate on any number of the eight elements in the vector. On a different hardware implementation that supports a different vector length (e.g., four elements), the vector-length agnostic operation may operate on the different number of elements made available to it by the underlying hardware. Thus, a compiler or programmer need not have explicit knowledge of the vector length supported by the underlying hardware (e.g., vector execution unit 204). In such embodiments, a compiler generates or a programmer writes program code that need not rely on (or use) a specific vector length. In some embodiments it may be forbidden to specify a specific vector size in program code. Thus, the compiled code in these embodiments (i.e., binary code) runs on other execution units that may have differing vector lengths, while potentially realizing performance gains from processors that support longer vectors. In such embodiments, the vector length may for a given hardware unit such as a processor may be read from a system register during runtime. Consequently, as process technology allows longer vectors, execution of legacy binary code simply speeds up without any effort by software developers.

Generally, vector lengths may be implemented as powers of two (e.g., two, four, eight, etc.). However, in some embodiments, vector lengths need not be powers of two. Specifically, vectors of three, seven, or another number of data elements can be used in the same way as vectors with power-of-two numbers of data elements.

As described further below, in various embodiments, each data element in the vector can contain an address that is used by vector execution unit 204 for performing a set of memory accesses in parallel. In such embodiments, if one or more elements of the vector contain invalid memory addresses, invalid memory-read operations can occur. Accordingly, invalid memory-read operations that would otherwise result in program termination may instead cause any elements with valid addresses to be read and elements with invalid elements to be flagged, allowing program execution to continue in the face of speculative, and in hindsight illegal, read operations.

In some embodiments, processor 102 (and hence vector execution unit 204) is able to operate on and use vectors of pointers. In such embodiments, the number of data elements per vector is the same as the number of pointers per vector, regardless of the size of the data type. Instructions that operate on memory may have variants that indicate the size of the memory access, but elements in processor registers should be the same as the pointer size. In these embodiments, processors that support both 32-bit and 64-bit addressing modes may choose to allow twice as many elements per vector in 32-bit mode, thereby achieving greater throughput. This implies a distinct throughput advantage to 32-bit addressing, assuming the same width data path. Implementation-specific techniques can be used to relax the requirement. For example, double-precision floating-point numbers can be supported in 32-bit mode through register pairing or some other specialized mechanism.

In the illustrated embodiment, the prefetch unit 208 includes a detection unit 209 and a control unit 211. The prefetch unit 208 may be configured to determine whether or not particular memory access patterns exist, calculate the next memory addresses to be accessed based upon any detected patterns, and prefetch the information at the calculated memory addresses. However, in contrast to conventional processors, the prefetch unit 208 may be configured to detect the memory access streaming pattern during vector memory accesses using vectors of effective addresses that are referenced by vector memory access instructions.

More particularly, in one embodiment, the vector execution unit 204 may implement a scatter/gather load architecture. As such, a vector memory access instruction may reference an associated vector of effective addresses. This vector of effective addresses includes a number of elements and each element includes a memory pointer, as mentioned above. The memory pointers in a given vector may or may not be related. That is, it is possible that each of the addresses may be independent of one another. Thus, during execution of the vector memory access instruction, the vector execution unit 204 may access multiple related or unrelated memory locations using the memory pointers of the vector of effective addresses.

However, when accessing large blocks of contiguous data in memory, it is possible that the pointers in a given vector memory access instruction may be related in a predictable way. For example, the pointers may represent a sequence of addresses separated by a particular interval or "stride." Because there may be multiple pointers and thus addresses associated with a given load, as described in greater detail below, in one embodiment, the prefetch unit 208 may be configured to detect a streaming access pattern based upon execution of a single vector memory access instruction. It is noted that in various embodiments, the vector memory access instruction may correspond to either a load or a store operation. It also is noted that in one embodiment the memory pointers of the vector of effective addresses are virtual addresses defined within a virtual address space. In addition, a memory access stride length of the memory access stride pattern may exceed a size of a virtual memory page in some embodiments.

In various embodiments, the detection unit 209 may be configured to detect the memory access streaming patterns, and the control unit 211 may be configured to calculate any prefetch addresses and perform the prefetching. More particularly, the detection unit 209 may keep track of and determine whether the memory pointer addresses within each vector of effective addresses form a pattern using arithmetic operations such as, for example, subtraction operations. Once a stride is detected, the control unit 211 may be configured to calculate the memory addresses to be prefetched based upon the stride, for example, and to perform the prefetching of the memory addresses to a memory such as, for example, the L1 cache 104, an L2 cache (not shown), or other memory.

In one embodiment, the detection unit 209 may perform prefetch operations based on a given vector of effective addresses, thereby using the pointers in the elements of that one vector to determine whether an access pattern is present. Thus, in such an embodiment, with a single memory access instruction, the detection unit 209 may detect an access pattern using the elements of the vector of effective addresses that is associated with that one memory access instruction. In embodiments that execute multiple vector instructions concurrently, the prefetch unit 208 may perform concurrent prefetch operations for each of the memory access instructions that are in flight.

It is possible that streaming patterns may span multiple vector memory access instructions. For example, if large quantities of data are being accessed, a sequence of pointers may span a number of vector memory access instructions. In some embodiments, each vector memory access instruction may be considered as an independent stream for purposes of prefetching. In such embodiments, stream detection may occur only on the basis of pointers within a given vector memory access instruction, without considering the relationship of those pointers to pointers in other instructions.

However, in some circumstances, identifying streaming patterns that span multiple vector memory access instructions may improve performance, particularly in systems that are capable of performing streaming prefetch operations that can be modified while the operation is underway (e.g., in a manner analogous to direct memory access (DMA) techniques). For example, in systems that exhibit high memory latency, the overhead associated with initiating a given prefetch operation may be large, owing to the delay incurred before the memory system begins to return data. In such cases, detecting that a given vector memory access instruction continues a stream detected from a previous instruction may enable a prefetch operation already in progress for the previous instruction to be extended to cover the current instruction. This may enable the addresses associated with the given instruction to be prefetched without paying the latency penalty of initiating a new prefetch operation. That is, when streaming patterns span multiple vector memory access instructions, in some circumstances the later instructions may "piggyback" on prefetch operations already in progress with respect to earlier instructions, instead of initiating new prefetch operations.

Correspondingly, in some embodiments, the detection unit 209 may be configured to detect access patterns that span two or more vector memory accesses. In such an embodiment, the detection unit 209 may maintain multiple previous vectors of effective addresses associated with prior vector memory access instructions. In one implementation, the detection unit 209 may use the addresses of one or more elements of the most recent previous vector, along with one or more elements of a new vector associated with a new memory access, to detect whether the current memory access stride pattern continues from one memory access instruction to the next. If an access pattern is determined to cross a vector boundary, the current prefetch operation may be extended.

More particularly, the control unit 211 may maintain the prefetch state information for the prefetch unit 208. For example, the control unit 211 may maintain the stride length, the prefetch starting address, the number of addresses to prefetch and/or a prefetch ending address, and the like, of the current prefetch. If a new memory access instruction is received while the control unit 211 is currently prefetching memory addresses based upon a previous vector memory access instruction, and the detection unit 209 detects that the access pattern from the previous instruction continues in the new instruction, the control unit 211 may simply update the prefetch state (e.g., number of addresses to prefetch and/or prefetch ending address) to continue prefetching. It is contemplated that in other embodiments, the detection unit 209 may be configured to detect access patterns across any number of vectors of effective addresses.

In addition, the processor 102, and particularly the vector execution unit 204 may be representative of a Macroscalar processor/execution unit that executes instructions in the Macroscalar architecture. Accordingly, as mentioned above and described in greater detail below, the Macroscalar architecture includes instructions that may be predicated. That is, based on the values contained in a vector of predicates or one or more scalar predicates, vector execution unit 204 may apply vector operations to selected vector data elements only. More particularly, the values in the predicate vector control which vector data elements are active and which vector data elements are inactive. Accordingly, because some of the elements in the vector of pointers may be inactive, in another embodiment, the detection unit 209 may be configured to take into account whether elements are inactive when performing subtraction operations to detect access patterns. Further details of the operation of one embodiment of the prefetch unit 208 are described in more detail below in conjunction with the description of FIG. 7.

Macroscalar Architecture Overview

An instruction set architecture (referred to as the Macroscalar Architecture) and supporting hardware may allow compilers to generate program code for loops without having to completely determine parallelism at compile-time, and without discarding useful static analysis information. Various embodiments of the Macroscalar Architecture will now be described. Specifically, as described further below, a set of instructions is provided that does not mandate parallelism for loops but, instead, enables parallelism to be exploited at runtime if dynamic conditions permit. Accordingly, the architecture includes instructions that enable code generated by the compiler to dynamically switch between non-parallel (scalar) and parallel (vector) execution for loop iterations depending on conditions at runtime by switching the amount of parallelism used.

Thus, the architecture provides instructions that enable an undetermined amount of vector parallelism for loop iterations but do not require that the parallelism be used at runtime. More specifically, the architecture includes a set of vector-length agnostic instructions whose effective vector length can vary depending on runtime conditions. Thus, if runtime dependencies demand non-parallel execution of the code, then execution occurs with an effective vector length of one element. Likewise, if runtime conditions permit parallel execution, the same code executes in a vector-parallel manner to whatever degree is allowed by runtime dependencies (and the vector length of the underlying hardware). For example, if two out of eight elements of the vector can safely execute in parallel, a processor such as processor 102 may execute the two elements in parallel. In these embodiments, expressing program code in a vector-length agnostic format enables a broad range of vectorization opportunities that are not present in existing systems.

In various embodiments, during compilation, a compiler first analyzes the loop structure of a given loop in program code and performs static dependency analysis. The compiler then generates program code that retains static analysis information and instructs a processor such as processor 102, for example, how to resolve runtime dependencies and to process the program code with the maximum amount of parallelism possible. More specifically, the compiler may provide vector instructions for performing corresponding sets of loop iterations in parallel, and may provide vector-control instructions for dynamically limiting the execution of the vector instructions to prevent data dependencies between the iterations of the loop from causing an error. This approach defers the determination of parallelism to runtime, where the information on runtime dependencies is available, thereby allowing the software and processor to adapt parallelism to dynamically changing conditions. An example of a program code loop parallelization is shown in FIG. 3.

Referring to the left side of FIG. 3, an execution pattern is shown with four iterations (e.g., iterations 1-4) of a loop that have not been parallelized, where each loop includes instructions A-G. Serial operations are shown with instructions vertically stacked. On the right side of FIG. 3 is a version of the loop that has been parallelized. In this example, each instruction within an iteration depends on at least one instruction before it, so that there is a static dependency chain between the instructions of a given iteration. Hence, the instructions within a given iteration cannot be parallelized (i.e., instructions A-G within a given iteration are always serially executed with respect to the other instructions in the iteration). However, in alternative embodiments the instructions within a given iteration may be parallelizable.

As shown by the arrows between the iterations of the loop in FIG. 3, there is a possibility of a runtime data dependency between instruction E in a given iteration and instruction D of the subsequent iteration. However, during compilation, the compiler can only determine that there exists the possibility of data dependency between these instructions, but the compiler cannot tell in which iterations dependencies will actually materialize because this information is only available at runtime. In this example, a data dependency that actually materializes at runtime is shown by the solid arrows from 1E to 2D, and 3E to 4D, while a data dependency that doesn't materialize at runtime is shown using the dashed arrow from 2E to 3D. Thus, as shown, a runtime data dependency actually occurs between the first/second and third/fourth iterations.

Because no data dependency exists between the second and third iterations, the second and third iterations can safely be processed in parallel. Furthermore, instructions A-C and F-G of a given iteration have dependencies only within an iteration and, therefore, instruction A of a given iteration is able to execute in parallel with instruction A of all other iterations, instruction B can also execute in parallel with instruction B of all other iterations, and so forth. However, because instruction D in the second iteration depends on instruction E in the first iteration, instructions D and E in the first iteration must be executed before instruction D for the second iteration can be executed.

Accordingly, in the parallelized loop on the right side, the iterations of such a loop are executed to accommodate both the static and runtime data dependencies, while achieving maximum parallelism. More particularly, instructions A-C and F-G of all four iterations are executed in parallel. But, because instruction D in the second iteration depends on instruction E in the first iteration, instructions D and E in the first iteration must be executed before instruction D for the second iteration can be executed. However, because there is no data dependency between the second and third iterations, instructions D and E for these iterations can be executed in parallel.

Examples of the Macroscalar Architecture

The following examples introduce Macroscalar operations and demonstrate their use in vectorizing loops such as the loop shown in FIG. 3 and described above in the parallelized loop example. For ease of understanding, these examples are presented using pseudocode in the C++ format.

It is noted that the following example embodiments are for discussion purposes. The actual instructions and operations are merely intended to aid an understanding of the architecture. However, in alternative embodiments, instructions or operations may be implemented in a different way, for example, using a microcode sequence of more primitive operations or using a different sequence of sub-operations. Note that further decomposition of instructions is avoided so that information about the macro-operation and the corresponding usage model is not obscured.

Notation

In describing the below examples, the following format is used for variables, which are vector quantities unless otherwise noted:

p5=a<b;

Elements of vector p5 are set to 0 or 1 depending on the result of testing a<b. Note that vector p5 can be a "predicate vector," as described in more detail below. Some instructions that generate predicate vectors also set processor status flags to reflect the resulting predicates. For example, the processor status flags or condition-codes can include the FIRST, LAST, NONE, and/or ALL flags.

~p5; a=b+c;

Only elements in vector 'a' designated by active (i.e., non-zero) elements in the predicate vector p5 receive the result of b+c. The remaining elements of a are unchanged. This operation is called "predication," and is denoted using the tilde ("~") sign before the predicate vector.

!p5; a=b+c;

Only elements in vector 'a' designated by active (i.e., non-zero) elements in the predicate vector p5 receive the result of b+c. The remaining elements of a are set to zero. This operation is called "zeroing," and is denoted using the exclamation point ("!") sign before the predicate vector.

```
if (FIRST( )) goto ...; // Also LAST( ), ANY( ), ALL( ), CARRY( ),
    ABOVE( ), or NONE( ), (where ANY( ) == !NONE( ))
```

The following instructions test the processor status flags and branch accordingly.

x+=VECLEN;

VECLEN is a machine value that communicates the number of elements per vector. The value is determined at runtime by the processor executing the code, rather than being determined by the assembler.

//Comment

In a similar way to many common programming languages, the following examples use the double forward slash to indicate comments. These comments can provide information regarding the values contained in the indicated vector or explanation of operations being performed in a corresponding example.

In these examples, other C++-formatted operators retain their conventional meanings, but are applied across the vector on an element-by-element basis. Where function calls are employed, they imply a single instruction that places any value returned into a destination register. For simplicity in understanding, all vectors are vectors of integers, but alternative embodiments support other data formats.

Structural Loop-Carried Dependencies

In the code Example 1 below, a program code loop that is "non-vectorizable" using conventional vector architectures is shown. (Note that in addition to being non-vectorizable, this loop is also not multi-threadable on conventional multi-threading architectures due to the fine-grain nature of the data dependencies.) For clarity, this loop has been distilled to the fundamental loop-carried dependencies that make the loop unvectorizable.

In this example, the variables r and s have loop-carried dependencies that prevent vectorization using conventional architectures. Notice, however, that the loop is vectorizable as long as the condition (A[x]<FACTOR) is known to be always true or always false. These assumptions change when the condition is allowed to vary during execution (the common case). For simplicity in this example, we presume that no aliasing exists between A[ ] and B[ ].

Example 1

Program Code Loop

```
r = 0;
s = 0;
for (x=0; x<KSIZE; ++x)
{
    if (A[x] < FACTOR)
    {
        r = A[x+s];
    }
    else
    {
        s = A[x+r];
    }
    B[x] = r + s;
}
```

Using the Macroscalar architecture, the loop in Example 1 can be vectorized by partitioning the vector into segments for which the conditional (A[x]<FACTOR) does not change. Examples of processes for partitioning such vectors, as well as examples of instructions that enable the partitioning, are presented below. It is noted that for this example the described partitioning need only be applied to instructions within the conditional clause. The first read of A[x] and the final operation B[x]=r+s can always be executed in parallel across a full vector, except potentially on the final loop iteration.

Instructions and examples of vectorized code are shown and described to explain the operation of a vector processor such as processor 102 of FIG. 2, in conjunction with the Macroscalar architecture. The following description is generally organized so that a number of instructions are described and then one or more vectorized code samples that use the instructions are presented. In some cases, a particular type of vectorization issue is explored in a given example.

dest=VectorReadInt(Base, Offset)

VectorReadInt is an instruction for performing a memory read operation. A vector of offsets, Offset, scaled by the data size (integer in this case) is added to a scalar base address, Base, to form a vector of memory addresses which are then read into a destination vector. If the instruction is predicated or zeroed, only addresses corresponding to active elements are read. In the described embodiments, reads to invalid addresses are allowed to fault, but such faults only result in program termination if the first active address is invalid.

VectorWriteInt(Base, Offset, Value)

VectorWriteInt is an instruction for performing a memory write operation. A vector of offsets, Offset, scaled by the data size (integer in this case) is added to a scalar base address, Base, to form a vector of memory addresses. A vector of values, Value, is written to these memory addresses. If this instruction is predicated or zeroed, data is written only to active addresses. In the described embodiments, writes to illegal addresses always generate faults.

dest=VectorIndex(Start, Increment)

VectorIndex is an instruction for generating vectors of values that monotonically adjust by the increment from a scalar starting value specified by Start. This instruction can be used for initializing loop index variables when the index adjustment is constant. When predication or zeroing is applied, the first active element receives the starting value, and the increment is only applied to subsequent active elements. For example:

x=VectorIndex(0,1)://x={0 1 2 3 4 5 6 7} dest=PropagatePostT(dest, src, pred)

The PropagatePostT instruction propagates the value of active elements in src, as determined by pred, to subsequent inactive elements of dest. Active elements, and any inactive elements that precede the first active element, remain unchanged in dest. The purpose of this instruction is to take a value that is conditionally calculated, and propagate the conditionally calculated value to subsequent loop iterations as occurs in the equivalent scalar code. For example:

| Entry: | dest | = { 8 | 9 | A | B | C | D | E | F } |
|---|---|---|---|---|---|---|---|---|---|
|  | src | = { 1 | 2 | 3 | 4 | 5 | 6 | 7 | 8 } |
|  | pred | = { 0 | 0 | 1 | 1 | 0 | 0 | 1 | 0 } |
| Exit: | dest | = { 8 | 9 | A | B | 4 | 4 | E | 7 } | dest=PropagatePriorF(src, pred)

The PropagatePriorF instruction propagates the value of the inactive elements of src, as determined by pred, into subsequent active elements in dest. Inactive elements are copied from src to dest. If the first element of the predicate is active, then the last element of src is propagated to that position. For example:

| Entry: | src | = { 1 2 3 4 5 6 7 8 } |
|---|---|---|
|  | pred | = { 1 0 1 1 0 0 1 0 } |
| Exit: | dest | = { 8 2 2 2 5 6 6 8 } | dest=ConditionalStop(pred, deps)

The ConditionalStop instruction evaluates a vector of predicates, pred, and identifies transitions between adjacent predicate elements that imply data dependencies as specified by deps. The scalar value deps can be thought of as an array of four bits, each of which designates a possible transition between true/false elements in pred, as processed from left to right. These bits convey the presence of the indicated dependency if set, and guarantee the absence of the dependency if not set. They are:

kTF—Implies a loop-carried dependency from an iteration for which the predicate is true, to the subsequent iteration for which the value of the predicate is false.
kFF—Implies a loop-carried dependency from an iteration for which the predicate is false, to the subsequent iteration for which the value of the predicate is false.
kFT—Implies a loop-carried dependency from an iteration for which the predicate is false, to the subsequent iteration for which the value of the predicate is true.
kTT—Implies a loop-carried dependency from an iteration for which the predicate is true, to the subsequent iteration for which the value of the predicate is true.

The element position corresponding to the iteration that generates the data that is depended upon is stored in the destination vector at the element position corresponding to the iteration that depends on the data. If no data dependency exists, a value of 0 is stored in the destination vector at that element. The resulting dependency index vector, or DIV, contains a vector of element-position indices that represent dependencies. For the reasons described below, the first element of the vector is element number 1 (rather than 0).

As an example, consider the dependencies in the loop of Example 1 above. In this loop, transitions between true and false iterations of the conditional clause represent a loop-carried dependency that requires a break in parallelism. This can be handled using the following instructions:

| p1 = (t < FACTOR); | // p1 = {000011100} |
|---|---|
| p2 = ConditionalStop(p1, kTF\|kFT); | // p2 = {00004060} |

Because the 4th iteration generates the required data, and the 5th iteration depends on it, a 4 is stored in position 5 of the output vector p2 (which is the DIV). The same applies for the 7th iteration, which depends on data from the 6th iteration. Other elements of the DIV are set to 0 to indicate the absence of dependencies. (Note that in this example the first element of the vector is element number 1.)

dest=GeneratePredicates(Pred, DIV)

GeneratePredicates takes the dependency index vector, DIV, and generates predicates corresponding to the next group of elements that may safely be processed in parallel, given the previous group that was processed, indicated by pred. If no elements of pred are active, predicates are generated for the first group of elements that may safely be processed in parallel. If Pred indicates that the final elements of the vector have been processed, then the instruction generates a result vector of inactive predicates indicating that no elements should be processed and the ZF flag is set. The CF flag is set to indicate that the last element of the results is active. Using the values in the first example, GeneratePredicates operates as follows:

| Entry Conditions: | // i2 = { 0 0 0 0 4 0 6 0 } |
|---|---|
| p2 = 0; | // p2 = { 0 0 0 0 0 0 0 0 } |
| Loop2: | |
| p2 = GeneratePredicates(p2,i2); | // p2'= { 1 1 1 1 0 0 0 0 } |
| CF = 0, ZF = 0 | |
| if(!PLAST( )) goto Loop2 | // p2''= { 0 0 0 0 1 1 0 0 } |
| | CF = 0, ZF = 0 |
| | // p2'''= { 0 0 0 0 0 0 1 1 } |
| | CF = 1, ZF = 0 |

From an initialized predicate p2 of all zeros, GeneratePredicates generates new instances of p2 that partition subsequent vector calculations into three sub-vectors (i.e., p', p'', and p'''). This enables the hardware to process the vector in groups that avoid violating the data dependencies of the loop.

In FIG. 4A a diagram illustrating a sequence of variable states during scalar execution of the loop in Example 1 is shown. More particularly, using a randomized 50/50 distribution of the direction of the conditional expression, a progression of the variable states of the loop of Example 1 is shown. In FIG. 4B a diagram illustrating a progression of execution for Macroscalar vectorized program code of the loop of Example 1 is shown. In FIG. 4A and FIG. 4B, the values read from A[ ] are shown using leftward-slanting hash marks, while the values written to B[ ] are shown using rightward-slanting hash marks, and values for "r" or "s" (depending on which is changed in a given iteration) are shown using a shaded background. Observe that "r" never changes while "s" is changing, and vice-versa.

Nothing prevents all values from being read from A[ ] in parallel or written to B[ ] in parallel, because neither set of values participates in the loop-carried dependency chain. However, for the calculation of r and s, elements can be processed in parallel only while the value of the conditional expression remains the same (i.e., runs of true or false). This pattern for the execution of the program code for this loop is shown in of FIG. 4B. Note that the example uses vectors having eight elements in length. When processing the first vector instruction, the first iteration is performed alone (i.e., vector execution unit 204 processes only the first vector element), whereas iterations 1-5 are processed in parallel by vector execution unit 204, and then iterations 6-7 are processed in parallel by vector execution unit 204.

Referring to FIG. 5A and FIG. 5B, diagrams illustrating one embodiment of the vectorization of program code are shown. FIG. 5A depicts the original source code, while FIG. 5B illustrates the vectorized code representing the operations that may be performed using the Macroscalar architecture. In the vectorized code of FIG. 5B, Loop 1 is the loop from the source code, while Loop 2 is the vector-partitioning loop that processes the sub-vector partitions.

In the example, array A[ ] is read and compared in full-length vectors (i.e., for a vector of N elements, N positions of array A[ ] are read at once). Vector i2 is the DIV that controls partitioning of the vector. Partitioning is determined by monitoring the predicate p1 for transitions between false and true, which indicate loop-carried dependencies that should be observed. Predicate vector p2 determines which elements are to be acted upon at any time. In this particular loop, p1 has the same value in all elements of any sub-vector partition; therefore, only the first element of the partition needs to be checked to determine which variable to update.

After variable "s" is updated, the PropagatePostT instruction propagates the final value in the active partition to subsequent elements in the vector. At the top of the loop, the PropagatePriorF instruction copies the last value of "s" from the final vector position across all elements of the vector in preparation for the next pass. Note that variable "r" is propagated using a different method, illustrating the efficiencies of using the PropagatePriorF instruction in certain cases.

Software Speculation

In the previous example, the vector partitions prior to the beginning of the vector-partitioning loop could be determined because the control-flow decision was independent of the loop-carried dependencies. However, this is not always the case. Consider the following two loops shown in Example 2A and Example 2B:

Example 2A

Program Code Loop 1

```
j = 0;
for (x=0; x<KSIZE; ++x)
{
if (A[x] < FACTOR)
{
j = A[x+j];
}
B[x] = j;
}
```

Example 2B

Program Code Loop 2

```
j = 0;
for (x=0; x<KSIZE; ++x)
{
if (A[x+j] < FACTOR)
{
```

-continued

```
j = A[x];
}
B[x] = j;
}
```

In Example 2A, the control-flow decision is independent of the loop-carried dependency chain, while in Example 2B the control flow decision is part of the loop-carried dependency chain. In some embodiments, the loop in Example 2B may cause speculation that the value of "j" will remain unchanged and compensate later if this prediction proves incorrect. In such embodiments, the speculation on the value of "j" does not significantly change the vectorization of the loop.

In some embodiments, the compiler may be configured to always predict no data dependencies between the iterations of the loop. In such embodiments, in the case that runtime data dependencies exist, the group of active elements processed in parallel may be reduced to represent the group of elements that may safely be processed in parallel at that time. In these embodiments, there is little penalty for mispredicting more parallelism than actually exists because no parallelism is actually lost (i.e., if necessary, the iterations can be processed one element at a time, in a non-parallel way). In these embodiments, the actual amount of parallelism is simply recognized at a later stage.

dest=VectorReadIntFF(Base, Offset, pf)

VectorReadIntFF is a first-faulting variant of VectorReadInt. This instruction does not generate a fault if at least the first active element is a valid address. Results corresponding to invalid addresses are forced to zero, and flags pf are returned that can be used to mask predicates to later instructions that use this data. If the first active element of the address is unmapped, this instruction faults to allow a virtual memory system in computer system 100 (not shown) to populate a corresponding page, thereby ensuring that processor 102 can continue to make forward progress.

dest=Remaining (Pred)

The Remaining instruction evaluates a vector of predicates, Pred, and calculates the remaining elements in the vector. This corresponds to the set of inactive predicates following the last active predicate. If there are no active elements in Pred, a vector of all active predicates is returned. Likewise, if Pred is a vector of all active predicates, a vector of inactive predicates is returned. For example:

Entry: pred={0 0 1 0 1 0 0 0}

Exit: dest={0 0 0 0 0 1 1 1}

FIG. 6A and FIG. 6B are diagrams illustrating embodiments of example vectorized program code. More particularly, the code sample shown in FIG. 6A is a vectorized version of the code in Example 2A (as presented above). The code sample shown in FIG. 6B is a vectorized version of the code in Example 2B. Referring to FIG. 6B, the read of A[ ] and subsequent comparison have been moved inside the vector-partitioning loop. Thus, these operations presume (speculate) that the value of "j" does not change. Only after using "j" is it possible to determine where "j" may change value. After "j" is updated, the remaining vector elements are re-computed as necessary to iterate through the entire vector. The use of the Remaining instruction in the speculative code sample allows the program to determine which elements remain to be processed in the vector-partitioning loop before the program can determine the sub-group of these elements that are actually safe to process (i.e., that don't have unresolved data dependencies).

In various embodiments fault-tolerant read support is provided. Thus, in such embodiments, processor 102 may speculatively read data from memory using addresses from invalid elements of a vector instruction (e.g., VectorReadFF) in an attempt to load values that are to be later used in calculations. However, upon discovering that an invalid read has occurred, these values are ultimately discarded and, therefore, not germane to correct program behavior. Because such reads may reference non-existent or protected memory, these embodiments may be configured to continue normal execution in the presence of invalid but irrelevant data mistakenly read from memory. (Note that in embodiments that support virtual memory, this may have the additional benefit of not paging until the need to do so is certain.)

In the program loops shown in FIG. 6A and FIG. 6B, there exists a loop-carried dependency between iterations where the condition is true, and subsequent iterations, regardless of the predicate value for the later iterations. This is reflected in the parameters of the ConditionalStop instruction.

The sample program code in FIG. 6A and FIG. 6B highlights the differences between non-speculative and speculative vector partitioning. More particularly, in Example 2A memory is read and the predicate is calculated prior to the ConditionalStop. The partitioning loop begins after the ConditionalStop instruction. However, in Example 2B, the ConditionalStop instruction is executed inside the partitioning loop, and serves to recognize the dependencies that render earlier operations invalid. In both cases, the GeneratePredicates instruction calculates the predicates that control which elements are used for the remainder of the partitioning loop.

Memory Prefetch Operations and Detecting Memory Streaming Accesses

As described above, the vector execution unit 204 may implement a scatter/gather load architecture, and as a result a vector memory access instruction may reference a vector of effective addresses. The vector of effective addresses includes a number of elements, and each element may include a memory pointer. Accordingly, in one embodiment, multiple independent memory accesses may be made in response to execution of one vector memory access instruction. Furthermore, the prefetch unit 208 may detect a memory access streaming pattern based upon the vector of effective addresses. The prefetch unit 208 may also calculate one or more prefetch memory addresses based upon the memory access streaming pattern, and prefetch the one or more prefetch memory addresses into a memory circuit.

Figure 7:
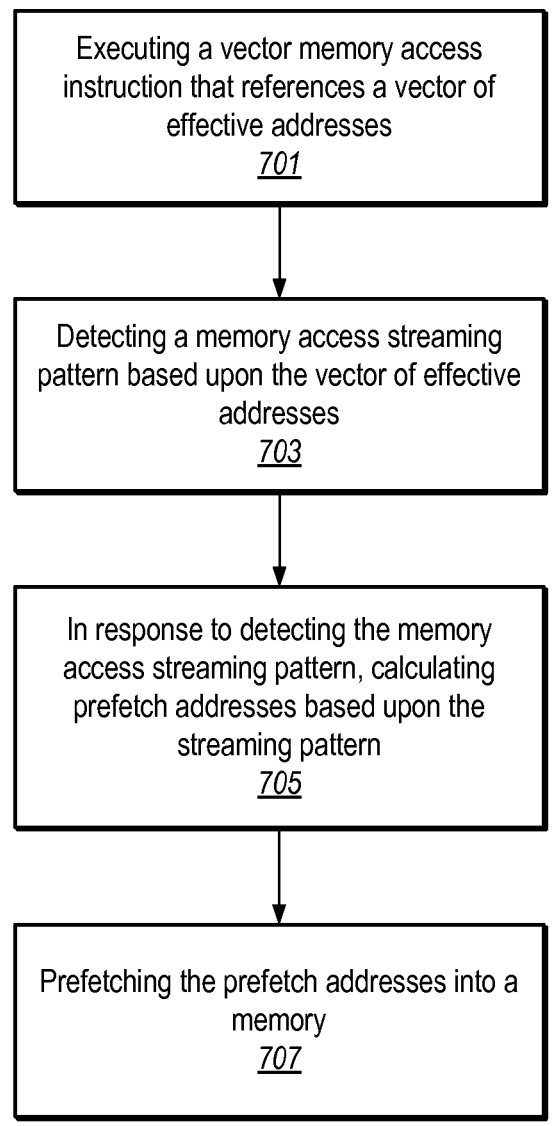
FIG. 7 is a flow diagram depicting the operation of one embodiment of the processor of FIG. 2 during memory prefetch operations.

In FIG. 7, a flow diagram depicting the operation of one embodiment of the processor of FIG. 2 during memory prefetch operations is shown. Referring collectively to FIG. 2 through FIG. 7 and beginning in block 701 of FIG. 7, the vector execution unit 204 executes a vector memory access instruction that references a vector of effective addresses. As described above, each of the elements of the vector includes a memory pointer.

The prefetch detection unit 209 is configured to detect a memory access streaming pattern or stride pattern based upon the addresses of the memory pointers (block 703). In one embodiment, the detection unit 209 may subtract the address of each element of the vector from the address of the element immediately preceding it. The detection unit 209 may then compare all the subtraction results to one another, and if the results are all the same value, then that value is the stride or distance between memory addresses.

However, as described above, the vector memory access instruction may be predicated by a predicate vector. As such, memory access instructions do not return data corresponding to the inactive elements of the vector of effective addresses. Thus, in one embodiment, the inactive elements of the vector of effective addresses may not be used during the detection of memory access patterns. For example, in a vector having some inactive elements, the detection unit 209 may skip the inactive elements entirely so that only the address of each active element is subtracted from the address of the immediately preceding active element, and the results are compared to determine if all the results have the same value.

In another embodiment, the address of each active element may be subtracted from the address of the immediately preceding element regardless of whether or not the element is inactive and the results compared to determine if all the results have the same value. This approach may detect a stream in the event that the inactive elements contain valid addresses that form part of a streaming sequence, even though the memory contents corresponding to the addresses of inactive elements will not be used on account of the predication.

In the embodiment just described, inactive elements may participate in the process of stream detection, which may be appropriate if the inactive elements contain valid effective address that happen to be disregarded due to predication. However, in some circumstances, the inactive elements of a vector memory access instruction may in fact contain invalid effective addresses, or addresses that otherwise do not follow a streaming pattern. Such circumstances suggest another approach for detecting streaming behavior beyond simply including the contents of inactive elements or disregarding inactive elements entirely. Instead of merely determining that the active addresses exhibit streaming behavior if considered as a sequence, it may be desirable to account for the number of inactive elements between two active elements (as opposed to the contents of such inactive elements) when performing stream detection. For example, suppose a vector memory access operation has three active elements, X, Y, and Z, and suppose that elements X and Y are adjacent, whereas elements Y and Z are separated by some number N of inactive elements that have invalid or otherwise non-streaming values. In some circumstances, it may be the case that elements X, Y, and Z would not exhibit a streaming pattern if treated as effectively adjacent. That is, the difference between elements X and Y might not equal the difference between elements Y and Z. Rather, elements X, Y, and Z might exhibit a streaming pattern if the number of inactive elements between Y and Z were accounted for. For example, if the difference between elements Y and Z were equal to N+1 times the difference between elements X and Y, then a streaming pattern may be found to exist. (This approach may be considered functionally equivalent to treating inactive elements as if they were part of a streaming pattern along with the active elements, regardless of the actual address contents of the inactive elements.)

Thus, in some embodiments, the detection unit 209 may be configured to take into account the number of inactive elements that are between the active elements that will be subtracted. More particularly, the result value obtained from the subtraction operation between a given pair of active elements may be adjusted based upon the number of inactive elements that are between the given pair of active elements. More particularly, in one embodiment the detection unit 209 may use division to determine the stride value. For example, the result of subtracting the addresses of a given pair of adjacent active elements may be divided by one more than the number of inactive elements that are between the given pair of active elements. Lastly, to detect whether a pattern exists, the adjusted result value may then be compared to other result values to determine if they are the same, and if they are, then that result value may be used as the stride length value.

In another embodiment, as described above, the detection unit 209 may detect a memory access pattern that spans across more than one vector of effective addresses resulting from multiple corresponding vector memory accesses. More particularly, the detection unit may use one or more of the elements of one or more previous vectors of effective addresses along with a current vector of effective addresses to determine if a stride pattern continues from one memory access to the next. In response to detecting that a stride pattern continues, the detection unit 209 may notify the prefetch control unit 211.

It is noted that in some embodiments, the particular scheme used to determine whether a memory access streaming pattern exists may be selectable as a configuration parameter of detection unit 209. For example, the scheme may be selected by other circuitry within the processor based on a dynamic determination of what scheme is appropriate (e.g., accounting for prior history). The scheme might also be selectable by software, e.g., via a control register or within the vector memory access instruction itself. Alternatively, detection unit 209 may implement and concurrently evaluate multiple ones of the schemes described above or suitable variants, and may deem a streaming pattern to exist if any one or more of the schemes indicate such a pattern.

The prefetch control unit 211 may, in response to the detection unit 209 detecting the pattern, calculate a number of addresses to prefetch based upon the memory access streaming pattern (block 705). For example, in one embodiment, the prefetch control unit 211 may use a predetermined prefetch algorithm to calculate the number of addresses to prefetch. (In some embodiments, prefetch control unit 211 may calculate a specific ending address for a prefetch operation instead of or in addition to calculating the number of addresses to prefetch.) As described above, the prefetch control unit 211 may maintain information corresponding to prefetch state. For example, in one embodiment, the prefetch control unit 211 may implement a state machine that keeps track of the number of prefetches that will occur, and how many of those prefetches are outstanding. During prefetch, the prefetch control unit 211 may update the number of prefetches that will occur by adding the number of additional addresses to the total number of prefetches that will occur in response to a notification that the detector 209 detected a continuation of a memory access pattern across a vector boundary, as described above.

The prefetch control unit 211 may the prefetch the addresses into a memory circuit (block 707). As described above, in various embodiments, the memory circuit may be any level of memory hierarchy, such as any cache level, or any level of system memory.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
executing a vector memory access instruction that references an associated vector of effective addresses, wherein the vector of effective addresses includes a plurality of elements, each element including a memory pointer, wherein the vector memory access instruction is executable to perform multiple independent memory access operations using at least some of the memory pointers of the vector of effective addresses;
detecting a memory access streaming pattern based upon the vector of effective addresses;
in response to detecting the memory access streaming pattern, calculating one or more prefetch memory addresses based upon the memory access streaming pattern; and
prefetching the one or more prefetch memory addresses into a memory circuit.

2. The method of claim 1, wherein detecting the memory access streaming pattern includes performing a subtraction operation between memory pointers of each pair of adjacent elements of the vector of effective addresses to produce a plurality of result values.

3. The method of claim 2, wherein detecting the memory access streaming pattern further includes determining that the result values are equal to a same value and setting a memory access stride length of the memory access streaming pattern to the same value.

4. The method of claim 1, wherein the vector memory access instruction is predicated upon a predicate vector having one or more predicate elements, wherein the one or more predicate elements each control whether a corresponding element of the vector of effective addresses is active and used during execution of the vector memory access instruction.

5. The method of claim 4, wherein detecting the memory access streaming pattern includes performing a subtraction operation between memory pointers of each pair of adjacent active elements of the vector of effective addresses to produce a plurality of result values, wherein performing the subtraction operation includes disregarding memory pointers corresponding to elements indicated by the predicate vector as inactive.

6. The method of claim 5, wherein detecting the memory access streaming pattern further includes, for a given pair of adjacent active elements of the vector of effective addresses and a corresponding one of the result values resulting from performing the subtraction operation on the given pair, adjusting the corresponding result value by a number of inactive elements that separate the elements of the given pair.

7. The method of claim 6, wherein adjusting the corresponding result value by the number of inactive elements that separate the elements of the given pair comprises dividing the corresponding result value by a quantity that is one more than the number of inactive elements that separate the elements of the given pair.

8. The method of claim 6, wherein detecting the memory access streaming pattern further includes, subsequent to adjusting the corresponding result value, determining that the result values are equal to a same value and setting a memory access stride length of the memory access streaming pattern to the same value.

9. The method of claim 1, wherein the memory pointers of the vector of effective addresses are virtual addresses defined within a virtual address space.

10. The method of in claim 9, wherein a memory access stride length of the memory access stride pattern exceeds a size of a virtual memory page.

11. A processor comprising:
an execution unit configured to execute a vector memory access instruction that references an associated vector of effective addresses, wherein the vector of effective addresses includes a plurality of elements, each element including a memory pointer, wherein the vector memory access instruction is executable to perform multiple independent memory access operations using at least some of the memory pointers of the vector of effective addresses; and a prefetch unit coupled to the execution unit and configured to:
  detect a memory access streaming pattern based upon the vector of effective addresses;
  calculate one or more prefetch memory addresses based upon the memory access streaming pattern in response to detecting the memory access streaming pattern; and
  prefetch the one or more prefetch memory addresses into a memory unit of the processor.

12. The processor of claim 11, wherein the vector memory access instruction corresponds to a load operation.

13. The processor of claim 11, wherein the vector memory access instruction corresponds to a store operation.

14. The processor of claim 11, wherein the prefetch unit is further configured to perform a subtraction operation between memory pointers of each pair of adjacent elements of the vector of effective addresses to produce a plurality of result values.

15. The processor of claim 14, wherein in response to a determining that the plurality of result values are equal to a same value, the prefetch unit is further configured to set a memory access stride length of the memory access streaming pattern to the same value.

16. A prefetch unit comprising:
  a detection unit configured to detect a memory access streaming pattern based upon a vector of effective addresses that is referenced by a vector memory access instruction upon execution;
  wherein the vector of effective addresses includes a plurality of elements, each element including a memory pointer, wherein the vector memory access instruction is executable to perform multiple independent memory access operations using at least some of the memory pointers of the vector of effective addresses; and
  a control unit coupled to the detection unit and configured to calculate one or more prefetch memory addresses based upon the memory access streaming pattern in response to detecting the memory access streaming pattern;
  wherein the control unit is further configured to prefetch the one or more prefetch memory addresses into a memory unit.

17. The prefetch unit of claim 16, wherein the detection unit is configured to detect the memory access streaming pattern in response to execution of a single instance of the vector memory access instruction.

18. The prefetch unit of claim 16, wherein the control unit is further configured to perform a subtraction operation between memory pointers of each pair of adjacent elements of the vector of effective addresses to produce a plurality of result values.

19. The prefetch unit of claim 18, wherein in response to a determining that the plurality of result values are equal to a same value, the prefetch unit is further configured to set a memory access stride length of the memory access streaming pattern to the same value.

20. A system comprising:
  a system memory; and
  a processor coupled to the system memory, wherein the processor includes:
    a cache memory;
    an execution unit coupled to the cache memory, and configured to execute a vector memory access instruction that references an associated vector of effective addresses, wherein the vector of effective addresses includes a plurality of elements, each element including a memory pointer;
    a load store unit coupled to the execution unit and configured to perform multiple independent memory access operations to the system memory using at least some of the memory pointers of the vector of effective addresses in response to execution of the vector memory access instruction; and
    a prefetch unit coupled to the execution unit and configured to:
      detect a memory access streaming pattern based upon the vector of effective addresses;
      calculate one or more prefetch memory addresses based upon the memory access streaming pattern in response to detecting the memory access streaming pattern; and
      prefetch the one or more prefetch memory addresses from the system memory into the cache memory.

21. The system of claim 20, wherein the prefetch unit is further configured to perform a subtraction operation between memory pointers of each pair of adjacent elements of the vector of effective addresses to produce a plurality of result values, and in response to determining that the plurality of result values are equal to a same value, the prefetch unit is further configured to set a memory access stride length of the memory access streaming pattern to the same value.

22. The system of claim 20, wherein the vector memory access instruction is predicated upon a predicate vector having one or more predicate elements, wherein the one or more predicate elements each control whether a corresponding element of the vector of effective addresses is active and used during execution of the vector memory access instruction.

23. The system of claim 22, wherein the prefetch unit is further configured to disregard memory pointers corresponding to elements indicated by the predicate vector as inactive to perform a subtraction operation between memory pointers of each pair of adjacent active elements of the vector of effective addresses to produce a plurality of result values, and in response to determining that the plurality of result values are equal to a same value, the prefetch unit is further configured to set a memory access stride length of the memory access streaming pattern to the same value.

24. The system of claim 23, wherein the prefetch unit is further configured to, for a given pair of adjacent active elements of the vector of effective addresses and a corresponding one of the result values resulting from performing the subtraction operation on the given pair, divide the corresponding result value by a quantity that is one more than the number of inactive elements that separate the elements of the given pair.

25. The system of claim 24, wherein the prefetch unit is further configured to, subsequent to dividing the corresponding result value, determine that the result values are equal to the same value and to set a memory access stride length of the memory access streaming pattern to the same value.

* * * * *

UNITED STATES PATENT AND TRADEMARK OFFICE
CERTIFICATE OF CORRECTION

| | | |
|---|---|---|
| PATENT NO. | : 8,850,162 B2 | Page 1 of 1 |
| APPLICATION NO. | : 13/477696 | |
| DATED | : September 30, 2014 | |
| INVENTOR(S) | : Jeffry E. Gonion | |

It is certified that error appears in the above-identified patent and that said Letters Patent is hereby corrected as shown below:

In the claims:

Claim 10, Column 20, Line 55 Please delete "of in" and substitute -- of --

Signed and Sealed this
Twenty-first Day of July, 2015

Michelle K. Lee
*Director of the United States Patent and Trademark Office*